United States Patent
Tamai et al.

[15] 3,655,542
[45] Apr. 11, 1972

[54] MODIFIED CELLULAR PARTICLE AND PROCESS FOR THE PRODUCTION THEREOF

[72] Inventors: Isamu Tamai; Minoru Oyama; Atsushi Osakada; Yasuo Shinohara, all of Otsu-shi, Japan

[73] Assignee: Toray Industries, Inc., Tokyo, Japan

[22] Filed: Mar. 5, 1969

[21] Appl. No.: 804,435

[52] U.S. Cl. ............204/159.2, 204/159.19, 260/2.5 E, 260/2.5 N, 260/2.5 B, 260/94.9 GA, 260/889, 264/54
[51] Int. Cl. ...................................C08f 47/10, C08f 29/04
[58] Field of Search..............................260/2.5, 2.5 E, 2.5 B; 204/159.17, 159.2, 159.19; 264/54

[56] References Cited

UNITED STATES PATENTS

| | | | |
|---|---|---|---|
| 3,098,832 | 7/1963 | Pooley et al. | 260/2.5 E |
| 3,294,869 | 12/1966 | Robinson | 204/159.17 |
| 3,298,975 | 1/1967 | Feild et al. | 260/2.5 |

Primary Examiner—Samuel H. Blech
Assistant Examiner—Wilbert J. Briggs, Sr.
Attorney—Paul & Paul

[57] ABSTRACT

A modified cellular particle is provided for molding cellular articles and comprises a partially foamed thermoplastic resin containing excess foaming agent which decomposes upon heating to generate a gas. The cellular particle has a mean specific gravity of 95 – 10 percent of the specific gravity of the resin composition, the polymer is cross-linked to a gel content of 20 – 90 percent and the particle has substantially no surface pores. The particles have a mean volume of 0.01 – 2 cc.

2 Claims, 7 Drawing Figures

MODIFIED CELLULAR PARTICLE AND PROCESS FOR THE PRODUCTION THEREOF

BACKGROUND OF THE INVENTION

1. Field of the Invention

The present invention relates to a modified cellular particle for molding cellular articles and a process for the production thereof, particularly, to a partially pre-expanded modified cellular particle which is useful for moulding to produce cellular articles. The particles are composed of a thermoplastic resin predominantly selected from the group consisting of polyethylene, polypropylene, polyvinyl chloride and polyamide.

2. Description of the Prior Art

Several processes are known for producing cellular particles of thermoplastic resins.

For instance, U.S. Pat. No. 2,744,291 teaches placing a cellular particle in a metal mold and heating and foaming the same. This process is effective for producing cellular articles having almost any shape. Heretofore, this process has been used for production of polystyrene foam and large quantities of polystyrene cellular articles have been produced industrially by this process. However, such process has not been applied to any thermoplastic resin other than polymers of the polystyrene series, because of difficulties in foaming and moulding.

A typical configuration of a sectional area of a cellular article, produced when U.S. Pat. No. 2,744,291 is applied to a low density polyethylene containing a proper nuclear agent and being cross-linked, appears in FIG. 1 of the drawings herein, showing that said invention is difficult to apply to polymers other than polystyrene, as will be discussed in further detail hereinafter.

According to the specification of U.S. Pat. No. 2,681,321, known polystyrene cellular particles are impregnated with a volatile hydrocarbon. However, if such a process is applied to polyethylene, polyvinyl chloride or polyamide, good cellular articles cannot be prepared from the product by any known process.

Japanese patent application publication No. 24073/1967 discloses the process of adding to a thermoplastic resin a volatile aliphatic hydrocarbon as a foaming agent, extruding the mixture without foaming and cutting after cooling. However, in the particles thus obtained the foaming agent tends to volatilize in storage and subsequent heating does not produce a good cellular article.

According to Belgian patent 697,785, polyethylene resin is mixed with a foaming agent in an extruder, the mixture is extruded and the product is cut into particles. During this period expansion is continued to produce foamed particles, which are irradiated to obtain cross-linked and foamed particles. Foaming and moulding are carried out by placing the particles into a metal mold and heating the mold to fuse each particle. However, these particles have little or no foaming potential at the time of molding, and there is little or no expansion of the foaming agent. Thus, the product is a cellular particle having many small hollow internal spaces. In making the molded article, sufficient fusion of the particles cannot be obtained. Accordingly, in this Belgian patent it is considered preferable to compress the article at the time of molding. However, it is then necessary to provide a metal mold which is rendered moveable by attaching a piston thereto, which requires special structure.

The present invention relates to modified cellular particles of thermoplastic resins other than polystyrene, particularly to a thermoplastic resin selected from the group consisting of polyethylene, polypropylene, polyvinyl chloride and polyamide, and to a process for the production thereof. According to the present invention, modified cellular particles are readily produced for the first time and can easily be used to produce high-quality cellular articles.

SUMMARY OF THE INVENTION

It has been found that cellular articles having excellent shock absorption properties can be produced easily from modified cellular particles consisting of a partially foamed thermoplastic resin selected from the group consisting of polyethylene, polypropylene, polyvinyl chloride and polyamide and containing residual excess foaming agent which decomposes upon heating to generate a gas, such particles having sufficient reserve foaming agent to provide a particle having a mean specific gravity of 95–10 percent of the specific gravity of the polymer composition itself. The polymer is cross-linked to a gel content of 20–90 percent. The particles have a mean volume of 0.01–2 cc, and substantially no surface pores.

The particles according to this invention are ideally constituted for producing a cellular article which is suitable for many uses, for example, for use as a shock absorber having any desired shape. For instance, the shock absorber may be located in the corners in the packing box for a television set, radio or the like. It has a shock absorption property which is better than that of the hitherto employed polystyrene foam. It can be made thin and the packing can be made compact. Also, the product of this invention can be moulded into safety cushions of various shapes for the interior of an automobile. It has good shock absorption capacity and a high safety factor. Also the cellular article is useful in in forming floats of various sizes and shapes.

An object of this invention is to provide modified cellular particles having substantially no surface pores for moulding cellular articles having excellent shock absorption property from a polymer predominantly consisting of either polyethylene, polypropylene, polyvinyl chloride or polyamide.

Another object of the invention is to provide an industrially advantageous process for producing the modified cellular particles.

A further object of the invention is to prevent a foaming agent from escaping from the inside of modified cellular particles in storage, which occurs when a volatile foaming agent is used to facilitate later foaming and moulding.

DETAILED EXPLANATION OF THE DRAWINGS

Figure 1:
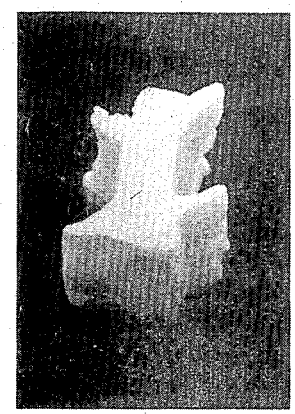
FIGS. 1–3 and FIG. 6 are photographs showing sectional areas of cellular articles.

FIG. 1 is a photograph (0.7X) of a molded cellular article with cross-section produced from cellular particles obtained when the process of U.S. Pat. No. 2,744,291 is applied to a cross-linked low density polyethylene containing a suitable nuclear agent. It shows that the cellular article is collapsed.

Figure 2:
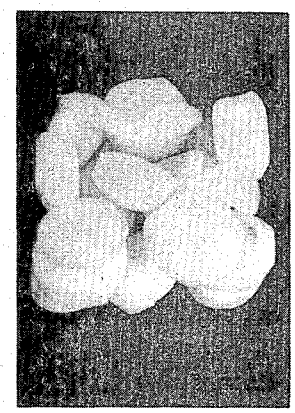
Figure 3:
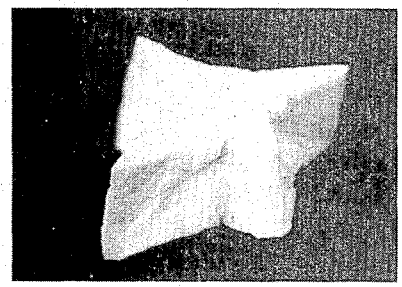

FIGS. 2 and 3 are photographs (0.7X) of a molded article with cross-sections produced from cellular particles according to the process of Belgian patent 697,785. FIG. 2 shows heat fused cellular particles, having many hollow spaces inside; heat fusing of the particles in the central portion of the article is insufficient. FIG. 3 shows a molded article produced from cellular particles according to the Belgian patent, but the article was steam heated in order to make heat fusing of the particles complete. The photograph shows how the molded particle collapses, and illustrates that moulding while compressing (using a movable piston or the like) is essentially indispensable in this type of process.

Figure 4:
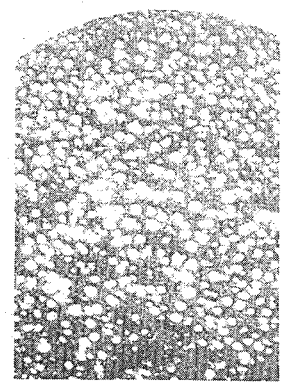
FIGS. 4–5 are enlarged photographs showing parts of sectional areas of cellular particle, as will be described in detail hereinafter.
Figure 5:

FIG. 4 and FIG. 5 are enlarged microscopic photographs of thin layer of about 0.05 mm. thickness obtained by slicing the particle of the present invention.

FIG. 4 is an enlarged photograph (22×) of a cellular particle obtained when the procedure of Example 1 of this specification is followed.

FIG. 5 is an enlarged photograph (66×) of a cellular particle obtained when the procedure of Example 11 of this specification is followed. As will be apparent from these photographs, the cellular particles have substantially no surface pores.

Figure 6:
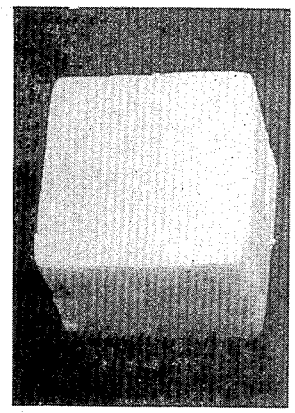

FIG. 6 is a photograph (0.7×) of a sectional area of a molded article produced from the cellular particles of the present invention. It shows that the article is free from collapse.

DESCRIPTION OF PREFERRED EMBODIMENTS

The thermoplastic resin in accordance with this invention may be any one selected from the group consisting of polyethylene, polypropylene, polyvinyl chloride and polyamide, or any resin composition containing at least 50 percent of one type or at least two types of resin selected from the group consisting of a high density polyethylene (specific gravity: 0.941–0.971), a medium density polyethylene (specific gravity: 0.926–0.940), a low density polyethylene (specific gravity: 0.914–0.925 measured in accordance with ASTM-D792-C50 or D1505), an isotactic polypropylene, polyvinyl chloride and polyamide, or a copolymer composition containing at least 50 percent of the ethylene component, propylene component, vinyl chloride component or polyamide component. Any of the aforementioned resins may be combined with 50 percent or less of another material such as rubber organic or inorganic filler, stabilizer, extender or pigment. The total of these ingredients is referred to herein as the "polymer composition." And the total of the polymer composition and ingredients described hereinafter, for example, foaming agent, decomposition promoter, cross-linking accelerator, etc. is referred to herein as the "material composition."

The expression "polyamide" as referred to herein is a generic name covering various industrially produced homopolymers such as "nylon 6" (polycaprolactam), "nylon 66" (polyhexamethylene adipamide), "nylon 610" (polydecamethylene adipamide), "nylon 11" (polyundecanamide) and "nylon 12" (polydodecanamide) and copolymers of these components; polymer blends of these are included.

The foaming agent which decomposes upon heating to generate a gas, as used in the present invention, is a so-called known decomposition-type organic foaming agent, for instance, diazoamino benzene, azodicarbonamide, azodicarboxylic acid ester, barium salt of azodicarboxylic acid, strontium salt of azodicarboxylic acid, hydrazodicarbonamide, azobisisobutyronitrile, dinitrosopentamethylene tetramine, trinitrosotrimethylenetriamine, N, N'-dinitroso-N, N'-dimethyl terephthalamide, benzensulfonylhydrazide, p-toluenesulfonyl hydrazide, toluene-2,4-disulfonylhydrazide, p-toluenesulfonylsemicarbazide, p, p'-oxybisbenzene-sulfonylhydrazide, p,p'-oxybisbenzenesulfonylcarbazide, bisbenzenesulfonylhydrazide, diphenylsulfone-3, 3'-disulfonyl-hydrazide, benzene-1, 3-disulfonylhydrazide, p-toluenesulfonyl-hydrazone, p,p'-diphenyldisulfonylazide, p-toluenesulfonylazide, nitroguanidine, trihydrazino-sym-triazine and nitrourea. However, other equivalent foaming agents are suitable. Most preferable is a foaming agent composition predominantly consisting of azodicarbonamide or dinitrosopentamethylene tetramine.

The decomposition-type chemical foaming agents are added in an amount of about 1–25 percent by weight, based on the weight of the polymer composition. In this case, a mixture of more than 50 percent of one or both of these two foaming agents, with less than 50 percent of one or more of the other foaming agents identified above, is also a preferable composition, all percentages herein being expressed by weight. Also, a hydrocarbon or other evaporation-type foaming agent of the hydrocarbon or halogenated hydrocarbon type may be mixed with the decomposition-type foaming agents in an amount of less than 50 percent. These foaming agents may be added with any decomposition promoter. Said decomposition promoter may be, for example, urea, stearic acid, citric acid, tartaric acid, and metal salts of these acids, oxide, chloride, sulfate, nitrate, carbonate and bicarbonate of lead, zinc, cadmium, chromium, iron, manganese, cobalt, calcium, barium and strontium, and others.

In the present invention, a decomposition-type foaming agent which decomposes upon heating at an elevated temperature to generate a gas is used as a foaming agent because it is possible to control properly the degree of decomposition of the foaming agent by controlling the extruding composition at an extruder. When an evaporation-type foaming agent is used, which gasifies by heating, such a control is very difficult and it is not possible in actual practice to produce particles having useful foaming potential.

The mean specific gravity as referred to herein is obtained by measuring the weights of 100 cellular particles selected by random sampling, and immersing these particles in water at room temperature and measuring the excluded volume. For instance, mean specific gravity can be measured by the following process:

One hundred cellular particles are selected at random and their total weight $W$ is measured. Next, these particles are placed in a graduated cylinder to which a predetermined amount $(V_1)$ of water is added. The particles floating above the surface of the water are pressed by means of a flat plate to hold them below the surface of the water and the volume $V_2$ is read at the surface line. The mean specific gravity is calculated from the following equation:

$$\text{Specific gravity} = \frac{W(g)}{V_2(cc) - V_1(cc)}$$

The expansion due to foaming produces a mean particle specific gravity of 95–10 percent of the specific gravity of the material composition.

In the process of preparing particles, only a minor part of a foaming agent added to the resin is decomposed; a major part of the foaming agent is not decomposed. This leaves foaming potential in the particle. Unless there is a sufficient foaming capacity, upon foaming and molding, hollow spaces are created among the particles, or the cellular article made from the particles contracts and is of inferior quality. When a particle is produced without first partially decomposing a foaming agent, the foaming agent foams in one step upon molding; in that case a great difference in specific gravity is obtained between the upper part and the lower part of a cellular article made from the particles, or the upper part of the cellular article does not expand to the same shape as the shape of the metal mold. Accordingly, it is highly preferable to decompose a part of the foaming agent and to limit the mean specific gravity of the cellular particle to 95–10 percent of the specific gravity of the material composition.

The preferable decomposition ratio of a foaming agent in a cellular particle varies depending upon the mixed amount of the foaming agent based on the material resin. Generally, this amount is large, the preferable decomposition ratio in the cellular particle is relatively small, and when the relative amount of foaming agent based on the material resin is small, the preferable decomposition ratio rises. However, in the present invention, it is an indispensable requirement that the cellular particle must retain foaming potential and that the decomposition ratio in the foaming agent must be below 70 percent.

The decomposition ratio in the cellular particle is determined by the following measuring process:

A test tube is provided having an internal diameter of about 15 mm. Into the tube about 1.5 g. of cellular particles of the present invention is placed. The test tube is heated in an oil bath in a manner to raise the temperature of the oil bath 2° C/minute. The total amount of gas generated by each existing temperature is measured and is corrected by a value obtained by heating a reference test tube containing no foaming agent, and a graph is plotted, showing temperature versus volume of gas liberated. This is noted as $V_2$. A similar test tube is also heated in the same way, containing 1.5 g. of the material composition. This volume is also plotted against temperature, and is referred to as $V_1$.

The relationship between the temperature and the amount of a decomposed gas is determined with respect to the material foaming agent composition and the cellular particle of the present invention. In the temperature-volume curves a sharp "break" occurs both as to $V_1$ (the amount of a gas generated from the material foaming agent composition) and $V_2$ (the amount of a gas generated from the cellular particle). Reading $V_1$ and $V_2$ at the point of such sharp break, the decomposition ratio (percent) is as follows:

Decomposition ratio (percent) = $(V_1 - V_2)/V_1 \times 100$

Figure 7:
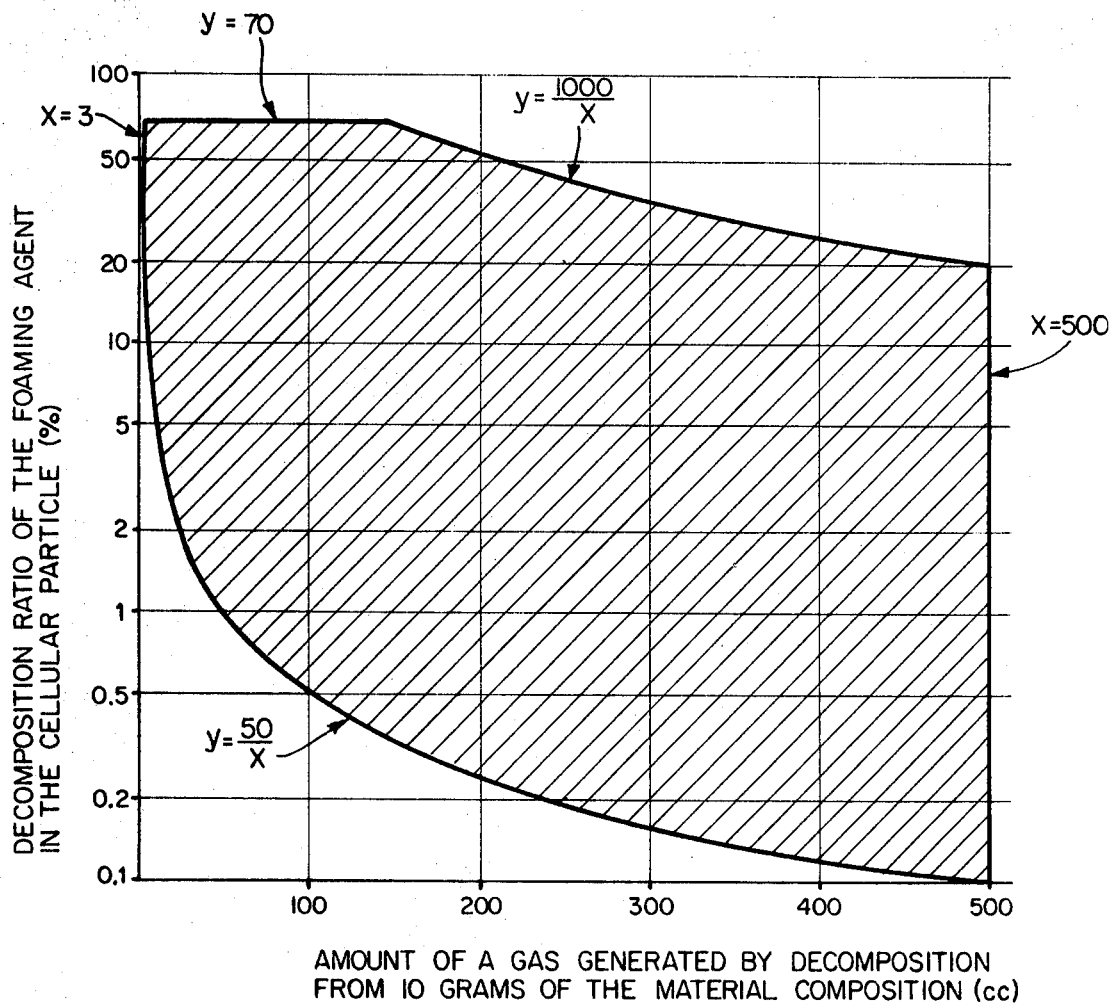
FIG. 7 shows a preferable range of decomposition ratio of a foaming agent in cellular particles according to this invention.

The preferable decomposition ratio of a cellular particle is within the range of FIG. 7 by the amount of a decomposed gas measured by the aforementioned process with respect to a material composition obtained by adding the predetermined foaming agent and various additives to the material resin.

Said range is an area surrounded by the equations $y = 50/x$, $y = 10,000/x$, $y = 70$, $x = 500$ and $x = 3$ when on the axis of the abscissa, the amount of gas (cc.) generated by decomposition from 10 grams of the material composition is expressed in an ordinary scale and on the axis of the ordinate, the decomposition ratio (percent) of the foaming agent in the cellular particle is expressed in log scale.

It is necessary for the modified cellular particle of the present invention to have the decomposition ratio of the foaming agent preferably in the range of FIG. 7 and the mean specific gravity of 10–95 percent of the specific gravity of the material composition.

The amount of a gas generated by decomposition from 10 grams of the material composition (the portion shown by the axis of abscissa in FIG. 7) can be measured by the aforementioned method. Also it can be determined when the kind of the foaming agent, the amount of a gas generated from 1 g. of the foaming agent and the mixed amount of the foaming agent in the material composition are known.

For instance, when azodicarbonamide is used as a foaming agent, (the volume of gas resulting from its decomposition is about 200 cc./g.) and assuming 15 parts of azodicarboxyamide are mixed with 100 parts of the material composition, the amount of a gas generated by decomposition from 10 grams of the material composition becomes 300 cc.

In order to decompose only a part of the foaming agent, it is desirable to control the temperature and residence time of the resin inside an extruder. More specifically, this is achieved by controlling the temperatures of the barrel and the die of the extruder, and the speed of rotation.

The decomposition temperature of a foaming agent, or of a mixture of a foaming agent with decomposition promoter, will be defined in further detail hereinafter. However, when the temperature of the resin in a die is made more than 15° higher than the defined decomposition temperature, the foaming agent decomposes almost completely and it is not possible to obtain a particle according to the present invention. The extruding conditions for producing the particle of the present invention vary depending upon the material conditions, (type of resin, type of foaming agent and amount of foaming agent), at the time of commencing operations under particular material conditions; temperature of the extruder barrel and the extruder die and velocity of the screw must be determined while measuring the specific gravity of the particle obtained.

By this means suitable conditions of operation can be determined easily and the particle of the present invention can be produced.

Further, it is necessary to keep the surface of the particle substantially free from pores, to prevent the surface from breaking to liberate a gas after extrusion. If the surface is broken and a porous surface is formed, this indicates that decomposition of the foaming agent has become excessive and temperatures of the barrel and of the die of the extruder must be lowered.

The gel portion as referred to in the present invention relates to the proportion of the product of a cross-linking reaction of a thermoplastic polymer constituting a cellular particle. This is an important element in the preparation of a high-quality cellular article. The use of a chemical cross-linking agent is appropriate; however, as will be mentioned later, a process using ionizing rays or ultraviolet rays is most preferable.

As to the degree of cross-linking, it is preferable to make the ratio of the gel portion to the polymer in the range of 20–90 percent. However, the particularly preferred range varies depending upon the type of thermoplastic resin. In case of a resin composition predominantly consisting of polyethylene, 25–60 percent of the polymer is an especially preferable range. In the case of a resin composition predominantly consisting of polypropylene, 30–70 percent of the polymer is an especially preferable range. In case of a resin composition predominantly consisting of polyvinyl chloride, 25–50 percent of the polymer is an especially preferable range. In case of a resin composition predominantly consisting of polyamide, 50–90 percent of the polymer is an especially preferable range. When the degree of cross-linking is outside the aforementioned upper and lower limits, the cellular article is collapsed and rough and bent, and is inferior.

In case of resin compositions predominantly consisting of polyethylene or polypropylene, a gel portion is obtained, for example, by making 0.2 g. of a test sample into a thin plate and putting it in 500 cc. of tetraline, heating the mixture at 135° C for 3 hours and measuring the undissolved portion. In case of a resin composition predominantly consisting of polyvinyl chloride, a gel portion is determined by making 0.2 g. of a test sample into a thin plate, treating it with dimethyl formamide at 100° C for 1 hour and the gel portion is determined as the amount of the undissolved part. In case of a resin composition predominantly consisting of polyamide, the gel portion is measured as follows: One gram of a test sample is cut into small pieces whose one side is smaller than 1 mm., and said pieces are put into 60 cc. of m-cresol and the mixed solution is heated at 50° C for 48 hours. The undissolved portion is the gel portion.

The condition of substantially having no porous surface as referred to in the present invention is not limited to a case wherein the interior of the particle is porous and the surface of the particle has a non-porous skin layer, but includes a case as shown in the photograph of FIG. 4, wherein a somewhat porous surface remains on the surface, but the pores on the surface are small as compared with the pores within the particle, showing an effect similar to that of substantially a skin layer.

The mean volume of a particle is 0.01–2 cc.; it is necessary that said volume is within this range. When said volume is larger than that, uniform foaming is not carried out, and the central part of the particle displays insufficient foaming. When said volume of the particle is smaller than 0.01 cc., the product does not have a small specific gravity, or a hollow space or spaces are created inside the cellular article.

By the present invention modified cellular particles for molding cellular articles of resin compositions predominantly consisting of polyethylene, polypropylene, polyvinyl chloride and polyamide are obtained for the first time.

The advantages of the modified cellular particle of the present invention are as follows:

A. The modified cellular particle of the present invention is pre-expanded as soon as it is extruded after being mixed and there is no necessity of providing a pre-expansion step as has been done heretofore in the case of polystyrene.

B. Because a resin in the softened state is cut, a particle whose surface is smooth is obtained, which prevents gas from escaping at the time of foaming and molding, giving good foaming properties.

C. Because the polymer is cross-linked, when the particle is foamed and molded, a good cellular article is obtained.

The mechanical, thermal and chemical properties are enhanced. Because cross-linking is carried out by ionizing rays or ultraviolet rays, the particle is cross-linked after it is produced, which is very advantageous for freely producing a particle having a shape and size most convenient for a cellular article.

D. Because a decomposition-type foaming agent is used, there is no necessity of storing a cellular particle in a sealed container as is required for conventional polystyrene cellular particles.

E. Because the particle of the present invention has sufficient retained foaming capacity, when foaming and molding are carried out in a metal mold of a fixed size, voids among particles disappear and a cellular article having a uniform interior is obtained. Accordingly, there is no necessity of using a compression step for obtaining a uniform cellular article as in the process of Belgian patent 697,785.

The cellular particle of the present invention is produced industrially, most advantageously, by the following process.

A thermoplastic resin, especially a thermoplastic resin predominantly consisting of polyethylene, polypropylene, polyvinyl chloride or polyamide is mixed with a foaming agent which decomposes upon heating at an elevated temperature to generate a gas in a convention screw-type extruder.

Such extruder includes an elongated barrel or housing, containing an elongated worm or screw having forwardly arranged generally helical flights, together with means for rotating the screw in relation to the barrel, to move the resinous material along continuously from a feed area to an outlet area. Often, the outlet includes a die through which the material is continuously expressed, and a continuous cutter for cutting the material into particles as it comes out of the die.

A part of the foaming agent decomposes in the extruder and the mixture is extruded from the die with expanding, and is cut into particles by the rotating blade of the cutter. Then, the cut particles are cooled to a temperature below the softening point of the resin. The particles are irradiated with ionizing rays or ultraviolet rays and a cellular particle cross-linked and pre-expanded having substantially no porous surface on the surface is produced.

Hereinbelow said process for the production will be elaborated.

Mixing of the resin and the foaming agent is carried out in the screw-type extruder, however, the ingredients may be mixed properly in any other suitable device before being supplied to the screw-type extruder. The extruder may be a single screw or a multi-screw extruder, either one of the vented type or the non-vented type. In short, any such apparatus is usable if it has a screw-type transfer mechanism. The inside of the screw-type extruder is heated (as from an external heating jacket) so as to soften the resin and decompose a part of the foaming agent. At this time, care must be taken so that some of the foaming agent does not decompose. Accordingly, depending upon the resin material, the extruding temperature varies and it is not possible to define it generally, however, it is normally within the range of 80°–250° C, preferably 100°–200 ° C. Because a part of the foaming agent has decomposed, the resin expands as soon as it passes through the die. And the extruded mixture is cut into particles by the rotating blade at any time before or after expansion but before it has cooled enough to solidify, and it is cooled to a temperature below the softening point of the resin. Cutting may be effected by using any known method, however, cutting by a rotating blade is preferable, which point is an important feature of the present invention. When cutting is effected after cooling and solidification, a porous surface appears on the cut surface, which is not preferable. When the extruded mixture is cut into particles before cooling and solidification, and the particles are subsequently cooled and solidified, the particles have substantially no surface pores and are highly desirable.

It is necessary for the modified cellular particle of the present invention to undergo a cross-linking reaction, which becomes an important factor in producing a good cellular article. As a cross-linking process, a process of using a chemical cross-linking agent is a possibility. However, when a chemical cross-linking agent is used, the foaming agent tends to decompose suddenly and not smoothly at the time of cross-linking or extrusion from a screw-type extruder, and it is accordingly ordinarily not possible to produce a high-quality cellular particle.

In case a cellular particle having a mean specific gravity of 70–95 percent of the specific gravity of the material composition is produced, it is necessary to carry out extrusion by maintaining the temperature of the resin in the extruder die below the decomposition temperature of the foaming agent or foaming agent composition. The cellular particle produced by this process has a smooth skin layer, almost free from foams on the surface, as shown in the photograph identified as FIG. 5 where, as previously stated, the magnification was 66×. And virtually no gas escapes from such a smooth skin layer and the gas accordingly remains inside the system upon foaming and a cellular article having a high foaming magnification is obtained. A foaming agent composition as herein referred to means a mixture of a foaming agent and a decomposition promoter thereof. The decomposition temperature of a foaming agent or a foaming agent composition is determined as follows:

Into a test tube having an internal diameter of about 15 mm., 0.15 g. of a foaming agent (or this and a predetermined amount of a decomposition promoter) and 1.5 g. of a powdered low density polyethylene are charged. The test tube is heated in an oil bath whose temperature is caused to rise at a rate of 2° C/min and the amount of a gas generated thereby is corrected by a value obtained by heating a reference test tube containing no foaming agent. A curve is prepared, showing the relationship between each existing temperature and the amount of the gas generated at that temperature. Along the curve, a break appears, corresponding to the amount of the gas generated at a point where the gas generating speed rapidly lowers. The temperature at which this break occurs is defined as the generating temperature.

One of the characteristics of the present invention is that cross-linking is carried out by using ionizing rays or ultraviolet rays and a good modified cellular particle is easily obtained. Ionizing rays are, for example $\alpha$ ray, $\beta$ ray, $\gamma$ ray, an accelerated electron beam, proton ray and neutron ray, however, industrially an accelerated electron beam is most easy to use.

When cross-linking is carried out, depending upon the type of resin and the type of ray, it is often necessary to add a cross-linking accelerator in advance. For example, when polyethylene is crossed-linked by means of exposure to ultraviolet rays, a carbonyl compound, an azide compound or sulfur compound may be used as an accelerator, e.g., benzaldehyde, acetophenone, benzophenone, dibenzylketone, benzyl, arylenediazide, alkylenepolysulfoneazide, dibenzylsulfide and $S_2Cl_2$ are used, but other accelerators may also be used. The preferred quantity of accelerator is about 0.1–5 percent by weight based on the weight of the resin. When polypropylene and polyvinyl chloride are cross-linked by means of an accelerated electron beam, a polyfunctional substance is added in advance, such substance having at least two radicals having active double bonds, for example divinylbenzene, diallylphthalate, diallylmaleate, ethylene glycol diallylate, ethylene glycol dimethacrylate, hydroquinone dimethacrylate, propylene glycol diacrylate, propylene glycol dimethacrylate and allyl methacrylate and other equivalent compounds. Preferably, about 0.1–20 percent by weight based on the resin is added.

When an accelerated electron beam is used to cross-link the particle to 20–90 percent of said gel content, said beam may be so controlled as to place the amount of beam absorption in the range of about 3–20 mega-rads. Any temperature of irradiation may be used, but it must be below the softening point of the cellular particle. Normally, irradiation is carried out at room temperature.

The present invention will be further explained by reference to the following examples, which are not intended to limit the scope of the invention. All parts are by weight except where otherwise indicated.

EXAMPLE 1

To a 65 mm. extruder, 100 parts of a low density polyethylene (specific gravity: 0.92), 10 parts of azodicarbonamide (specific gravity: 1.6), 3 parts of zinc oxide (specific gravity: 5.6) and 0.3 part of zinc chloride (specific gravity: 2.9) (the specific gravity of this material composition: 1.11 and the amount of a gas generated by decomposition from 10 g. of this material composition: 200 cc.) were supplied and they were mixed. The decomposition temperature of this foaming agent composition was about 135° C. When the barrel temperature of the extruder was established at 150° C, almost all of the foaming agent decomposed, therefore, the barrel temperature was gradually lowered and at last the barrel temperature of the extruder was set at 130° C. On the orifice plate of the extruder 27 orifices each having a diameter of 2 mm. were provided, the mixture was continuously extruded through said orifices and immediately thereafter all material was hot-cut continuously into pieces 2 mm. long by means of a continuously rotating cutter blade. The extruded mixture foamed somewhat and expanded as soon as it was extruded and the mean specific gravity of the particles obtained after cooling was 0.48 (43 percent of the specific gravity of the material composition, decomposition ratio of the foaming agent: about 5 percent) and the particle had substantially no surface pores. An enlarged (magnification: 22×) photograph of the sectional area of said particle was shown in FIG. 4. Next, said particle was irradiated with an electron beam by a Van de Graaff electron accelerator so that the amount of absorbed beam was 7 mega-rads. After irradiation, when the ratio of gel component of the particle was measured, it was 45 percent.

The modified cellular particle thus obtained was put into a perforated metal mold and steam-heated under a gauge pressure of 5 kg./cm.$^2$ for 2 minutes and a good cellular article was obtained having a specific gravity of 0.07, which was uniform and free from collapse. A photograph of the cellular article was shown in FIG. 6.

COMPARATIVE EXAMPLE 1 (a)

Following the procedure reported in Example 1, but when an electron beam was irradiated so that the absorbed beam amount was only 2.5 mega-rads, a particle having a gel content of 10 percent was obtained. This cellular particle was foamed and molded under the conditions of Example 1, however, the generated foam was collapsed and a cellular article having a specific gravity of 0.4 was obtained. By the same token, when the amount of absorbed beam was made 25 mega-rads and the gel content was 85 percent, a cellular article having poor foams and a specific gravity of 0.6 only was obtained, and fusing among particles was not good.

COMPARATIVE EXAMPLE 1 (b)

The procedure of Example 1 was followed, but the extruded mixture was not hot-cut, but cooled in elongated cylindrical form and withdrawn and then cut to produce particles. To this particle an electron beam was similarly irradiated to form a cellular particle having the same gel content. When this particle was foamed and molded, the cellular article product collapsed when it was attempted to produce a cellular article having a specific gravity of 0.07. When it was molded in an attempt to produce a specific gravity of 0.14, a cellular article was barely obtained.

EXAMPLE 2

Sixty parts of a low density polyethylene (specific gravity: 0.92), 40 parts of a high density polyethylene (specific gravity: 0.95), 7.5 parts of azodicarbonamide (specific gravity: 1.6), 7.5 parts of dinitroso pentamethylene tetramine (specific gravity: 1.5) and 5 parts of zinc oxide (specific gravity: 2.9) (the specific gravity of this material composition being 1.09, and the amount of a gas generated by decomposition from 10 g. of this material composition: 290 cc.) were mixed. The decomposition temperature of this foaming agent composition was about 175° C. After varying the extrusion temperature to determine a preferable condition, and after settling upon 170° C in the extruder used in Example 1, the mixture was extruded and hot-cut to produce particles having a mean specific gravity of 0.52 (48 percent of the specific gravity of the material composition, decomposition ratio of the foaming agent: about 3 percent) having substantially no surface pores. The particles were irradiated with an electron beam by application of a Van de Graaff electron accelerator, so that the absorbed beam amount was 3 mega-rads. The gel content of the particles was 50 percent.

This modified cellular particle was foamed and moulded as in Example 1. Steam having a gauge pressure of 10 kg./cm.$^2$ was used. The obtained cellular article having a specific gravity of 0.04 was uniform and free from collapse and of good quality.

EXAMPLE 3

One hundred parts of a low density polyethylene (specific gravity: 0.92), 12 parts of azodicarbonamide (specific gravity: 1.6), 5 parts of zinc oxide (specific gravity: 2.9) and 1 part of benzophenone (specific gravity: 1.15) (the specific gravity of this material composition: 1.07 and the amount of a gas generated by decomposition from 10 g. of the material composition: 240 cc.) were heated. The decomposition temperature of this foaming agent composition was about 165° C. At first the preferable condition was sought and as a preferable condition determined to be 150° C using the extruder used in Example 1. The extruded mixture was hot-cut to obtain particles having a mean specific gravity of 0.50 (47 percent of the specific gravity of the material composition, decomposition ratio of the foaming agent: about 4 percent) having substantially no surface pores. This particle was irradiated with ultraviolet ray from a distance of 5 cm. using a 400 W high-pressure mercury lamp for 15 minutes. As a result a particle having a gel content of 60 percent was obtained.

EXAMPLE 4

Following the procedure of Example 1, instead of 100 parts of a low density polyethylene the polymer material was 100 parts of an ethylene, vinyl acetate copolymer copolymerized with 15 percent of vinyl acetate (specific gravity: 0.94) (the specific gravity of this material composition: 1.13). The decomposition temperature of the foaming agent composition and the extruding conditions were the same as those in Example 1. The particles obtained had a (mean) specific gravity of 0.45 (40 percent of the specific gravity of the material composition, decomposition ratio of the foaming agent: about 7 percent). The particles obtained had substantially no surface pores. When an electron beam was irradiated into this type of particle, so that the absorbed beam amount was 5 mega-rads, a modified cellular article having a gel content of 40 percent was obtained. When this modified cellular particle was foamed and molded, a cellular article having a specific gravity of 0.08 was obtained without any difficulty.

COMPARATIVE EXAMPLE 4 (a)

In Example 4, when extrusion was carried out at a barrel temperature of the extruder of 105° C, particles were obtained wherein the foaming agent was completely unfoamed. To this particle, an electron beam in an amount the same as that in Example 4 was irradiated and the particle was foamed and molded under the same conditions as in Example 4. The moulded article obtained had a mean specific gravity of 0.08, however, it was not uniform such that there were many hollow spaces in the upper part and the specific gravity was low in the upper part and high in the lower part.

EXAMPLE 5

Following the procedure of Example 2, instead of 40 parts of a high density polyethylene the polymer material was 20 parts of a medium density polyethylene (specific gravity: 0.94) and 20 parts of polybutadiene (specific gravity: 0.91) (the specific gravity of this material composition: 1.08). The decomposition temperature of the foaming agent composition and the extruding conditions were the same as those in Example 2. A modified cellular article having a mean specific gravity of 0.50 (46 percent of the specific gravity of the material composition, the decomposition ratio of the foaming agent: 4 percent) and a gel content of 42 percent was obtained without any problem whatsoever. The foaming and molding were also good.

EXAMPLE 6

One hundred parts of crystalline polypropylene having an isotactic degree (percent by weight of an insoluble part in boiling n-heptane) of 95 (specific gravity: 0.91), 10 parts of azodicarbonamide (specific gravity: 1.6), 5 parts of divinyl benzene (specific gravity: 0.92) and 0.3 part of a heat stabilizer (specific gravity: about 1.8) (the specific gravity of this material composition: 0.98) were heated and mixed at 190° C. The selection of a temperature of 190° C was due to the fact that the decomposition temperature of this foaming agent was 195° C and when the extruding condition was examined, it was found that 190° C was preferable using the extruder in Example 1. The extruded mixture was hot-cut to obtain particles having a mean specific gravity of 0.45 (46 percent of the specific gravity of the material composition, the decomposition ratio of the foaming agent: about 5 percent) having substantially no surface pores. An electron beam was irradiated into this particle from a Van de Graaff electron accelerator so that the amount of absorbed beam was 8 mega-rads. The gel content of the particle was 55 percent. This modified cellular particle was foamed and molded in the same manner as in Example 1. In this case, instead of steam, heating was carried out with the use of hot air at 200° C for 4 minutes. The cellular article obtained had a specific gravity of 0.05, and was uniform, free from collapse and of good quality. This cellular article was harder than a polyethylene cellular article and free from brittleness as possessed by a polystyrene cellular article.

COMPARATIVE EXAMPLE 6 (a)

In Example 6 when an electron beam was irradiated so that the absorbed beam amount became 2 mega-rads, particles having a gel content of 15 percent were obtained. These cellular particles were foamed and moulded under the same conditions as in Example 6, however, collapse of foams was vigorous and a warped cellular article having coarse foams and a specific gravity of 0.38 only was obtained. Also, when the absorbed beam amount was made 30 mega-rads and the gel content was made 85 percent, the product was poor, as above described.

EXAMPLE 7

A composition was prepared consisting of 100 parts of a crystalline propylene-ethylene copolymer having an isotactic degree of 65 and copolymerizing 5 percent of ethylene (specific gravity: 0.91), 15 parts of azodicarbonamide (specific gravity: 0.6), 3 parts of zinc oxide (specific gravity: 2.9), 3 parts of diallylphthalate (specific gravity: 1.1) and 0.3 part of heat stabilizer (specific gravity: about 1.8). The specific gravity of this material composition was 1.05. The decomposition temperature of this foaming agent was 170° C. The mixture was heated, mixed and extruded at 170° C using the extruder used in Example 1, the extruded mixture was hot-cut to produce particles having a mean specific gravity of 0.50 (48 percent of the specific gravity of the material composition). The decomposition ratio of the foaming agent was about 3 percent. The particles had substantially no surface pores. To said particles an electron beam was irradiated from a Van de Graaff electron accelerator so that the absorbed beam amount was 8 mega-rads. The gel content of said particle was 53 percent.

This modified cellular particle was foamed and moulded in the same manner as in Example 1. Steam having a gauge pressure of 10 kg./cm.$^2$ was used. The cellular article obtained had a specific gravity of 0.035, being of good quality and having uniform, fine sealed foam voids.

COMPARATIVE EXAMPLE 7 (a)

In Example 7, when said composition was extruded from an extruder into sheets 3 mm. thick, after cooling an electron beam was irradiated into these sheets so that the absorbed beam amount was 8 mega-rads. Next, said sheets were cut into square shapes of 3 × 3 mm. to produce cellular particles. On the surface of said particles porous surfaces were exposed.

These cellular particles were subjected to attempts at foaming and molding in various ways. However, a cellular article having a specific gravity of below 0.055 could not be obtained.

EXAMPLE 8

A mixture was prepared consisting of 100 parts of polyvinyl chloride (degree of polymerization: 1,050) (specific gravity: 1.4), 50 parts of dioctyl phthalate (specific gravity: 1.1), 10 parts of azodicarbonamide (specific gravity: 1.6), 1 part of lead stearate (specific gravity: 2), 0.2 part of dibutyl tin maleate (specific gravity: 1.27) and 3 parts of ethylene glycol dimethacrylate (specific gravity: 1.06), said mixture having a specific gravity of 1.33. The decomposition temperature of the foaming agent in this composition was 165° C. The mixture was heated and mixed at 150° C using the extruder used in Example 1. The extruded mixture was hot-cut to obtain particles having a mean specific gravity of 0.8 (60 percent of the specific gravity of the material composition, the decomposition ratio of the foaming agent: about 5 percent). To said particles an electron beam was irradiated from a Van de Graaff electron accelerator so that the absorbed beam amount was 7 mega-rads. The gel content of said particle was 28 percent. These modified cellular particles were foamed and moulded the same as in Example 1. Steam having a gauge pressure of 10 kg./cm.$^2$ was used. The cellular article obtained had a specific gravity of 0.06, having uniform foam voids and uniform elasticity.

COMPARATIVE EXAMPLE 8 (a)

In Example 8, when to the particles obtained by hot-cuttings, an electron beam was irradiated so that the absorbed beam amount was 2 mega-rads, the gel content of said particle was 7 percent. When these particles were foamed and molded under the same conditions as in Example 8, the foam gas escaped and a collapsed cellular article having a specific gravity of 0.75 was obtained.

EXAMPLE 9

A mixture was prepared having a specific gravity of 1.35, the decomposition temperature of the foaming agent in this composition was 165° C consisting of 100 parts of powdered polyvinyl chloride (degree of polymerization: 750), (specific gravity: 1.4), 30 parts of dioctyl phthalate (specific gravity: 1.1), 13 parts of azodicarbonamide (specific gravity: 1.6), 3 parts of a barium-cadmium-type stabilizer (specific gravity: about 2), and 6 parts of divinyl benzene (specific gravity: 0.92). The mixture was heated, mixed and extruded at 150° C using the extruder used in Example 1, the extruded mixture was hot-cut to produce particles having a mean specific gravity of 0.75 (58 percent of the specific gravity of the material composition, the decomposition ratio of the foaming agent: about 5 percent) having substantially no surface pores. To said particles an electron beam was irradiated from a Van de Graaff electron accelerator so that the absorbed beam amount was 9 mega-rads. The gel content of said particle was 30 percent. These modified cellular particles were foamed and molded the same as in Example 1. Steam having a gauge pressure of 8 kg./cm.² was used. The cellular article obtained had a specific gravity of 0.05, being uniform and of good quality, free from collapse.

EXAMPLE 10

A mixture was prepared having a specific gravity of 1.13, the decomposition temperature of the foaming agent in this composition was 175° C, consisting of 100 parts of powdered terpolymer of epsilon-caprolactam, hexamethylene diammonium adipate and hexamethylene diammonium sebacate (melting point: 160° C) (specific gravity: 1.1), 6 parts of N, N'-methylenebis-acrylamide (specific gravity: 0.9) and 10 parts of azodicarbonamide (specific gravity: 1.13). The mixture was fed to the extruder of Example 1, and the mixture was heated, mixed and extruded at a resin temperature at a die of 170° C. By hot-cutting of the extruded mixture, particles having a mean specific gravity of 0.65 (58 percent of the specific gravity of the material composition, the decomposition ratio of the foaming agent: 4 percent) were obtained. To said particles an electron beam was irradiated from a Van de Graaff electron accelerator so that the absorbed beam amount was 10 mega-rads. The gel content of said particle was 68 percent. When these particles were foamed and molded the same as in Example 1 (except that the steam had a gauge pressure of 15 kg./cm.²), a good, uniform cellular article having a specific gravity of 0.07 free from collapse was obtained.

EXAMPLE 11

A mixture was prepared containing 100 parts of a low density polyethylene (specific gravity: 0.92), 10 parts of azodicarbonamide (specific gravity: 1.6), 3 parts of zinc oxide (specific gravity: 5.6) and 0.3 part of zinc chloride (specific gravity: 2.9) (the specific gravity of the material composition: 1.11, the decomposition temperature of this foaming agent composition was 135° C) were supplied to a 65 mm. extruder and mixed at a barrel temperature of the extruder of 120° C. At that time the temperature of the resin inside the die was 126° C. On the orifice plate of the extruder 27 orifices each having a diameter of 2 mm. were provided and the mixture was extruded through these orifices, and immediately thereafter the extruded mixture was hot-cut by a rotating blade into pieces about 2 mm. long. The mean specific gravity of the particles obtained after cooling was 0.80 and since the specific gravity of the material composition was 1.11, the former was about 72 percent of the latter, and the decomposition ratio of the foaming agent was about 2 percent. The surface of the particle was almost completely smooth and rupture of cells on the surface could not be observed by the naked eye. An enlarged (magnification: 66×) photograph of the sectional area of said particle was shown in FIG. 5. To said particle an electron beam was irradiated from a Van de Graaff electron accelerator so that the absorbed beam amount became 5 mega-rads. After irradiation, when the gel content of the particle was measured, it was 32 percent.

The modified cellular particle obtained was put into a perforated metal mould and heated by steam having a gauge pressure of 4 kg./cm.². A good cellular article having a specific gravity of 0.05, free from collapse, was obtained.

COMPARATIVE EXAMPLE 11 (a)

When in Example 11, an electron beam was irradiated so that the absorbed beam amount became 2.5 mega-rads, a particle having a gel content of 10 percent was obtained. This cellular particle was foamed and molded under the conditions of Example 11; however the generated foams could not be retained and an article having a specific gravity of 0.4 and collapsed foams only was obtained. Similarly, when the absorbed beam amount was made 25 mega-rads and the gel content was made 85 percent, foaming was poor and an article having a specific gravity of 0.8 was obtained wherein fusing among particles was poor.

COMPARATIVE EXAMPLE 11 (b)

In Example 11, the extruded mixture was not hot-cut, but cooled in a form of extrudate and withdrawn and then cut to produce particles. To this particle an electron beam was irradiated similarly to produce a cellular particle having the same gel content. When this particle was foamed and molded with the object of making a cellular article having a specific gravity of 0.06, the cellular article collapsed. When the objective was a specific gravity of 0.08, a cellular article was barely obtained.

EXAMPLE 12

Eighty parts of a low density polyethylene (specific gravity: 0.92), 20 parts of a high density polyethylene (specific gravity: 0.95), 10 parts of azodicarbonamide (specific gravity: 1.6), 5 parts of dinitroso pentamethylene tetramine (specific gravity: 1.5) and 6 parts of zinc oxide (specific gravity: 2.9) (the specific gravity of this material composition was 1.10, the decomposition temperature of this foaming agent composition was 160° C) were put into the extruder used in Example 11, heated and mixed at 140° C (the temperature of the resin inside the die was 155° C), the mixture was extruded and hot-cut to produce particles having a mean specific gravity of 0.92 (since the specific gravity of the material composition was 1.10, it was 84 percent of the latter, the decomposition ratio of the foaming agent was about 0.5 percent). The surface of this particle was smooth and rupture of cells on the surface could not be seen by the naked eye. To this particle, an electron beam was irradiated from a Van de Graaff electron accelerator so that the absorbed beam amount was 6 mega-rads. The gel content of this particle was 42 percent. This modified cellular particle was foamed and moulded the same as in Example 11. Steam having a gauge pressure of 10 kg./cm.² was used. The obtained cellular article had a specific gravity of 0.038, being of good quality and free from collapse.

EXAMPLE 13

One hundred parts of a low density polyethylene (specific gravity: 0.92), 12 parts of azodicarbonamide (specific gravity: 1.6), 3 parts of lead oxide (specific gravity: 2.9) and 1 part of benzophenone (specific gravity: 1.1, the specific gravity of the material composition was 1.08, the decomposition temperature of this foaming agent composition was 165° C) were heated to 125° C inside the extruder used in Example 11 (the temperature of the resin inside the die was 130° C). The extruded mixture was hot-cut to obtain particles having a mean specific gravity of 0.95 (since the specific gravity of the material composition was 1.08, it was 88 percent thereof and the decomposition ratio of the foaming agent was about 1 percent). The surface of this particle was smooth and rupture of cells on the surface could not be seen by the naked eye. To this particle, ultraviolet ray was irradiated from a distance of 5 cm. by a 400 W high pressure mercury lamp for 15 minutes. As a result a particle having a gel content of 56 percent was obtained.

The modified cellular particle obtained was foamed and molded by a process the same as that in Example 11 by heating with steam having a gauge pressure of 8 kg./cm.². The cellular article obtained had a mean specific gravity of 0.050. Its foam structure was fine, uniform and good.

EXAMPLE 14

Following the procedure described in Example 11, instead of 100 parts of a low density polyethylene, 100 parts of an ethylene-vinyl acetate copolymer copolymerizing 15 percent of vinyl acetate (specific gravity: 0.94) was used. The decomposition temperature of the foaming agent composition and the extruding conditions were the same as those in Example 11.

The particle obtained had a smooth surface, a specific gravity of 0.85 (since the specific gravity of the material composition was 1.11, it was 77 percent thereof, and the decomposition ratio of the foaming agent was 1.5 percent) was irradiated with an electron beam so that the absorbed beam amount was 5 mega-rads to obtain a cellular particle having a gel content of 45 percent. When this cellular particle was foamed and molded, a cellular article having a specific gravity of 0.06 was obtained without any problem.

EXAMPLE 15

A mixture was made up of:
a. One hundred parts of crystalline polypropylene having an isotactic degree of 95 which was measured by dropping boiling n-heptane onto the powdered sample (which had an average particle size above 100 mesh) for 24 hours, extracting the soluble part and calculating as weight percent of the remaining insoluble portion (specific gravity: 0.91).
b. Ten parts of azodicarbonamide (specific gravity: 1.6) (the decomposition temperature of this foaming agent was 195° C),
c. Five parts of divinylbenzene (specific gravity: 0.92), and
d. 0.3 part of a heat stabilizer (specific gravity: about 1.8).

The specific gravity of the material composition was 0.96. The mixture was heated and mixed at 180° C using the extruder of Example 11, the extruded mixture was hot-cut to obtain particles having a specific gravity of 0.84 (since the specific gravity of the material composition was 0.96, it was 88 percent thereof, and the decomposition ratio of the foaming agent was about 1 percent). The surface of this particle was smooth and rupture of cells on the surface could not be seen by the naked eye. To this particle, an electron beam was irradiated from a Van de Graaff electron accelerator so that the absorbed beam amount was 8 mega-rads. The gel content of this particle was 50 percent. This modified cellular particle was foamed and molded the same as in Example 11, but in this case instead of steam, heated air at 230° C was used to heat the particle for 4 minutes. The cellular particle obtained had a specific gravity of 0.047, being uniform and of good quality, free from collapse. Also, this cellular article was harder than a polyethylene cellular article, having no such brittleness as that of a polystyrene cellular article.

EXAMPLE 16

One hundred parts of a crystalline propylene-ethylene copolymer copolymerizing 5 percent of ethylene having an isotactic degree of 65 (specific gravity: 0.91), 15 parts of azodicarbonamide (specific gravity: 1.6), 3 parts of zinc oxide (specific gravity: 2.9) (the decomposition temperature of this foaming agent composition: 170° C), 3 parts of diallylphthalate (specific gravity: 0.9) and 0.3 part of a heat stabilizer (specific gravity: about 1.8), (the specific gravity of the material composition: 1.05) were heated, mixed and extruded at 160° C using the extruder of Example 11 (the temperature of the resin inside the die was 164° C), the extruded mixture was hot-cut to produce particles having a mean specific gravity of 0.80 (since the specific gravity of the material composition was 1.05, it was 76 percent thereof, the decomposition ratio of the foaming agent: about 1 percent). To this particle an electron beam was irradiated from a Van de Graaff electron accelerator so that the absorbed beam amount was 6 mega-rads. The gel content of this particle was 47 percent.

This modified cellular particle was foamed and molded the same as in Example 11. Steam having a gauge pressure of 10 kg./cm.² was used. The cellular article obtained had a specific gravity of 0.033, having fine closed cell structure.

COMPARATIVE EXAMPLE 16 (a)

In Example 16, said composition was extruded from an extruder into sheets 3 mm. thick, and after cooling an electron beam was irradiated to said sheets so that the absorbed beam amount became 8 mega-rads. Subsequently, said sheets were cut into square shapes of 3 × 3 mm. to produce cellular particles. The mean specific gravity of this particle was 0.78. Efforts were made to foam and mold these particles in various ways; however, a cellular article having a specific gravity of less than 0.046 was not obtained.

EXAMPLE 17

A mixture consisting of 100 parts of polyvinyl chloride (degree of polymerization: 1,050) (specific gravity: 1.4), 50 parts of dioctyl phthalate (specific gravity: 1.1), 10 parts of azodicarbonamide (specific gravity: 1.6), 1 part of lead stearate (specific gravity: about 1.8) (the decomposition temperature of this foaming agent composition in polyvinyl chloride: 165° C), 0.2 part of dibutyl tin maleate (specific gravity: about 1.8) and 3 parts of ethylene glycol dimethacrylate (specific gravity: 0.9) (the specific gravity of the material composition: 1.32) was heated and mixed at 140° C using the extruder of Example 11 (the temperature of the resin inside a die: 143° C), the extruded mixture was hot-cut to obtain particles having a mean specific gravity of 1.2 (since the specific gravity of the material composition was 1.32, it was 91 percent thereof, and the decomposition ratio of the foaming agent: about 0.5 percent) having no recognizable collapse of foams. To this particle an electron beam was irradiated from a Van de Graaff electron accelerator so that the absorbed beam amount was 7 mega-rads. The gel content of the particle was 30 percent. This modified cellular particle was foamed and molded the same as in Example 11. Steam having a gauge pressure of 10 kg./cm.² was used. The cellular article obtained had a specific gravity of 0.055, having uniform foams, being elastic.

COMPARATIVE EXAMPLE 17 (a)

In Example 17, when to the particle obtained by hot-cutting an electron beam was irradiated so that the absorbed beam amount was 2 mega-rads, the gel content of the particle was 6 percent. When this particle was foamed and molded under conditions the same as in Example 11, the foam forming gas escaped and a collapsed cellular article having a specific gravity of 0.90 was obtained.

EXAMPLE 18

One hundred parts of a low density polyethylene (specific gravity: 0.92), 2 parts of azodicarbonamide (specific gravity: 1.6), 0.6 part of zinc oxide (specific gravity: 5.6) and 0.06 part of zinc chloride (specific gravity: 2.9) (the specific gravity of this material composition: 0.93, the decomposition temperature of this foaming agent composition: 135° C) were supplied to the 65 mm. extruder and mixed at a barrel temperature of 130° C. At this time the temperature of the resin inside the die was 133° C. The mean specific gravity of the particle obtained by hot-cutting was 0.55, that was 59 percent of the specific gravity of the material composition and the decomposition ratio of the foaming agent was 22 percent. The surface of the particle was smooth and rupture of cells on the surface could not be seen by the naked eye. To this particle, an electron beam was irradiated from a Van de Graaff electron accelerator so that the absorbed beam amount was 7 mega-rads. After irradiation, when the gel content of the particle was measured it was 48 percent. When the obtained modified cellular particle was put into a perforated metal mould and heated by steam having a gauge pressure of 5 kg./cm.² for 4 minutes, a good cellular article having a specific gravity of 0.15, free from collapse, was obtained.

COMPARATIVE EXAMPLE 18 (a)

In Example 18, when the temperature of the barrel of the extruder was made 135° C, the temperature of the resin inside the die became 140° C. The particle obtained under this condition had a mean specific gravity of 0.27, however, the decomposition ratio of the foaming agent was 75 percent. This particle was foamed and molded under the same conditions as in Example 18, however, because it had no foaming potential, when it was molded in an effort to obtain an article having a specific gravity of 0.15, the cellular article collapsed. When it was molded in an effort to obtain an article having a specific gravity of 0.2, a cellular article having no collapse was barely obtained, however, there were many hollow spaces among the particles.

The following is claimed:

1. A process for producing a modified cellular particle, which comprises the sequential steps of mixing in a screw-type extruder a composition comprising a thermoplastic resin selected from the group consisting of polyethylene and polypropylene and a foaming agent which decomposes upon heating at an elevated temperature to generate a gas in an amount of 1–25 percent based on the weight of said thermoplastic resin, decomposing less than 70 percent of said foaming agent, extruding the mixture, cutting into particles the extruded mixture before it is cooled and solidified, cooling the particles to a temperature below the softening point of the resin and applying 3–20 mega-rads of ionizing rays to said particles to cross-link the same.

2. A process according to claim 1 wherein the temperature of the resin inside the die is made 100°–220° C.

* * * * *